Figure 3:
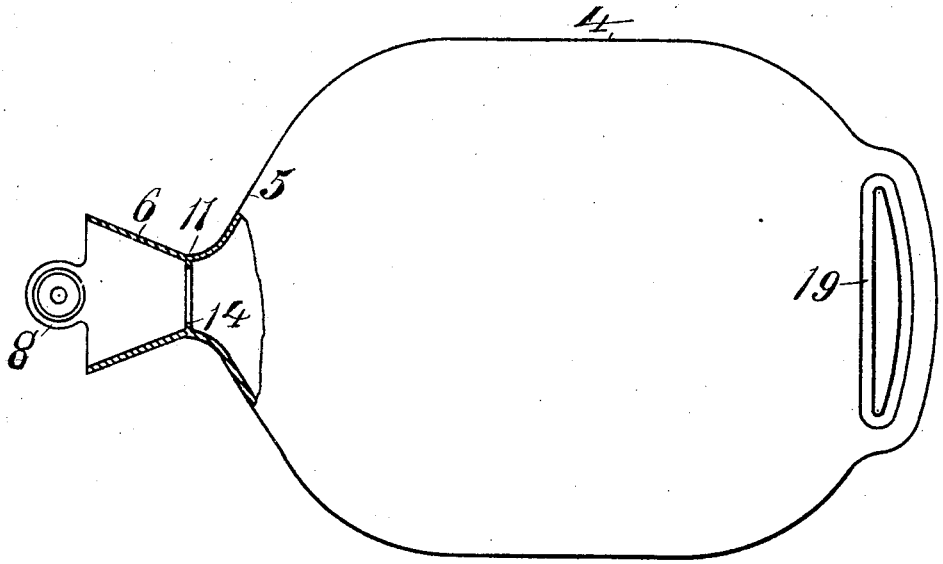

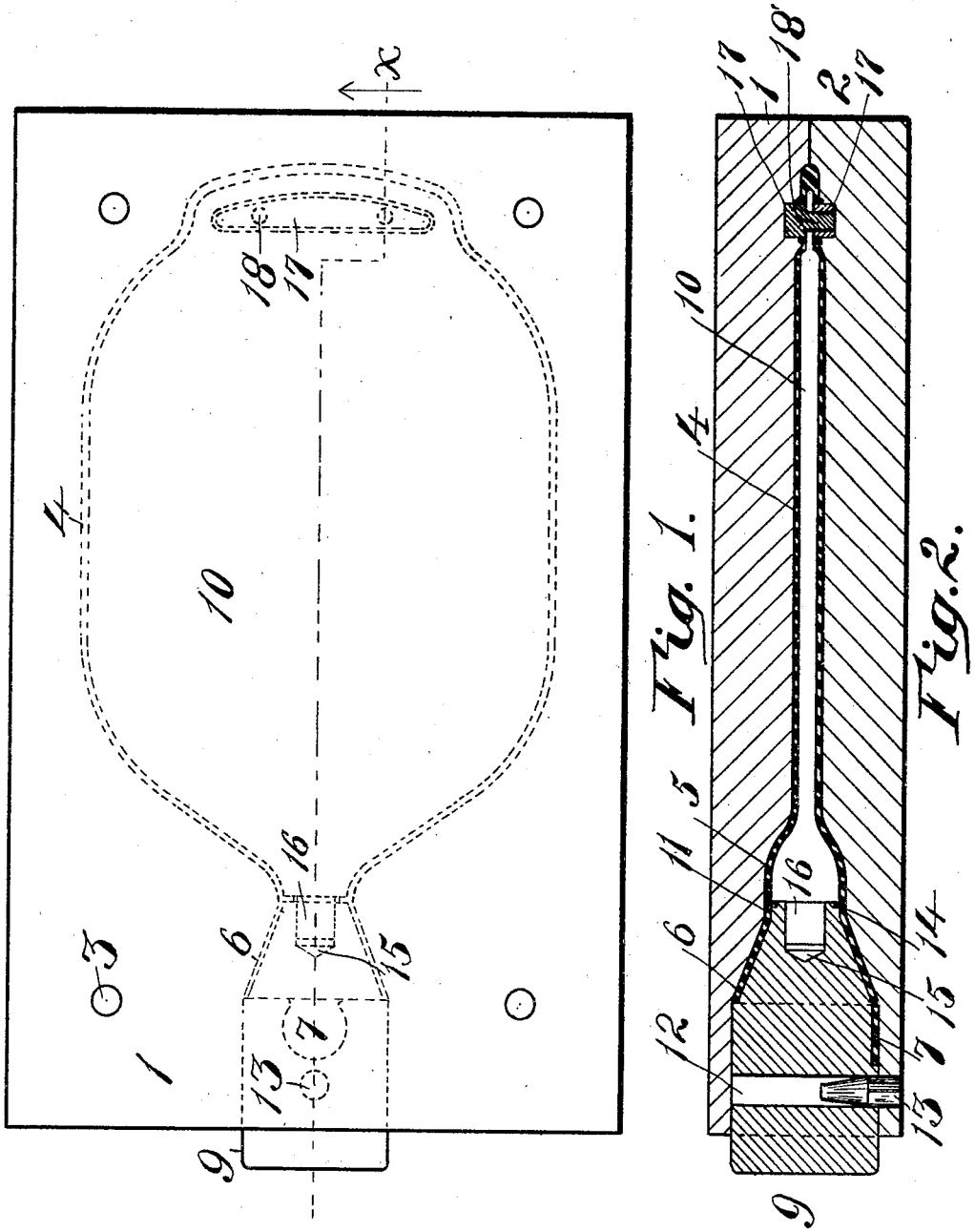

No. 809,143. PATENTED JAN. 2, 1906.
E. J. SCHUTZ.
METHOD FOR MAKING HOT WATER BOTTLES.
APPLICATION FILED SEPT. 18, 1905.

2 SHEETS—SHEET 2.

Witnesses:
A. E. Kling
Glenara Fox

Inventor:
E. J. Schutz
by C. E. Humphrey.
Atty.

UNITED STATES PATENT OFFICE.

EDWARD J. SCHUTZ, OF AKRON, OHIO.

METHOD FOR MAKING HOT-WATER BOTTLES.

No. 809,143.  Specification of Letters Patent.  Patented Jan. 2, 1906.

Application filed September 18, 1905. Serial No. 278,958.

*To all whom it may concern:*

Be it known that I, EDWARD J. SCHUTZ, a citizen of the United States, residing at Akron, in the county of Summit and State of Ohio, have invented new and useful Improvements in Methods for Making Hot-Water Bottles, of which the following is a specification.

This invention has relation to methods for manufacturing rubber hot-water bottles.

The object of this invention is to provide a new and improved method for manufacturing rubber hot-water bottles in which the filling-funnel, which is adapted to contain the stopper-receiving means, will be made integral and simultaneously with the body of the bottle, thus avoiding the weakness of a cement joint at this point.

The invention further aims, in manufacturing hot-water bottles, to provide a suitable method of removing the core or mandrel from the interior of the molded bottle in such a manner that the integrity of the bottle will in no wise be impaired and for properly finishing the opening through which the mandrel is withdrawn, whereby the opening made will constitute a convenient device for attaching the bottle to a sustaining medium when the bottle is hung up to dry.

Heretofore the only method which has been employed in making vulcanized hot-water bottles to my knowledge consists in using two sheets of unvulcanized rubber of proper conformation to constitute the water-bottle to be made therefrom, then cementing their outer edges together and reinforcing this joint by a binding-strip of rubber retained in position by cement and attaching to the neck portion of the bottle a filling-funnel separately formed by means of a cement joint. While uniting the edges of the bottle and in applying the binding-strip thereto a hand-tool is employed in the interior of the bottle while the fingers of the operator are working on the outside thereof. The interior of the water-bottle is then coated with soapstone or analogous material to prevent the two sides of the bottle from sticking together, and the entire bottle is then vulcanized in what is known as an "open heat" as contradistinguished from being vulcanized in a mold in which there is a mandrel for shaping the interior of the bottle. The hand-tool employed in the interior of the bottle is withdrawn before the bottle is vulcanized. This method produces bottles lacking in strength, stability, and capability of resistance to the action of hot water, the use of which results in impairing the joint made by the cement, resulting in a leak within a very short time by reason of the softening of the cement employed, there being no mechanical strengthening device used to maintain the union of the cemented and contacting surfaces of the two parts of the bottle. Another disadvantage attending the manufacture of a bottle by the foregoing method is that the halves or sides which ultimately are to be united together to form the bottle have not the shape imparted to them which they will assume when formed into a bottle, and therefore are at once distorted by the water, which exerts a strain upon the cemented joints, whereas by making bottles entirely in one piece by my improved method the bottle is cured in a mold in the form which it will assume when filled and is wholly without seams.

It will be here stated that as far as I know a method for making water-bottles provided with filling-funnels made integral with the body of the bottle is entirely new in the art to which this invention appertains, for the reason that no method heretofore used has provided any way whereby the core or mandrel by which the interior of the bottle could be formed may be removed therefrom.

In carrying out my improved method for making rubber hot-water bottles I employ certain mechanical instrumentalities, a preferred form of which is shown in the drawings in connection with this specification, although it is entirely within the scope of this invention to employ other devices for utilizing this method without in any manner departing from the scope thereof.

Figure 4:
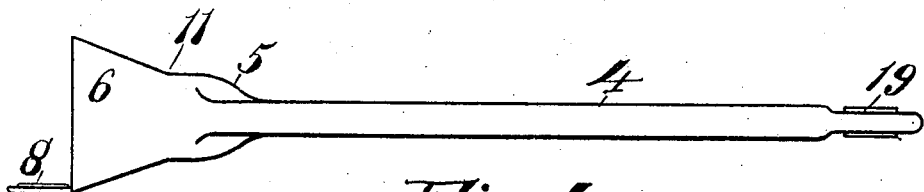
Figure 5:
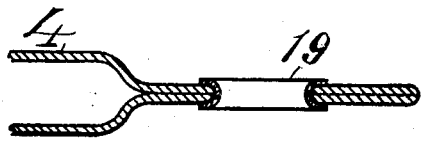

In the drawings, in which similar reference-numerals indicate like parts in the different figures, Figure 1 is a plan view of a mold used in carrying out my improved method for manufacturing hot-water bottles, the filling-funnel and the body of the bottle both being shown in this drawing in dotted lines. Fig. 2 is a section of Fig. 1 at the line X. Fig. 3 is a plan view of a finished hot-water bottle made by my improved method with a portion thereof in section to better illustrate the construction thereof. Fig. 4 is an edge elevation of Fig. 3, and Fig. 5 a sectional view showing the means for closing the opening in the bottle through which the core or mandrel is removed.

In manufacturing rubber hot-water bottles by using my improved method I employ molds, preferably of metal, for shaping the bottle during the time it is undergoing the vulcanizing or curing process. These molds customarily consist of an upper portion 1 and a lower portion 2, adapted to be retained in proper position with respect to each other by dowel-pins passed through suitable openings 3 in both of the halves of the mold. The inner contacting faces of the two members 1 and 2 constituting the mold are formed to impart to the outside of the article the shape which it will ultimately have when finished. It will be seen by referring to Fig. 2 that the central portion of the openings in the abutting faces of the mold members are approximately parallel at the point 4 to give to the finished article a similar conformation, and to the left of this (see Fig. 2) the opening is enlarged at the point 5, which forms or shapes that portion of the bottle which is immediately below the filling-funnel and is adapted to receive the stopper-receiving socket. From this point the openings in the mold members are outwardly flaring at the point 6 to properly shape the outside portion of the filling-funnel.

In the member 2 and connecting with that portion of the mold which shapes the filling-funnel is a properly-shaped opening 7 to impart to the hot-water bottle an ear, which is to subsequently receive a gromet 8, (see Fig. 3,) by which the bottle may be suspended with the filling-funnel upward.

The interior of the bottle is shaped by a divided core separable into two parts 9 and 10 at the point 11. The core 9 consists of a body portion provided with an opening 12, into which is inserted a dowel-pin 13, properly retained in position. The right-hand end of this core 9 (see Fig. 2) is conically formed and is provided at its extreme right end with a rabbet, into which the material of which the bottle is constituted may enter to form in the finished article an inturned annular rib 4. Centrally disposed in the right end of this core 9 is an opening 15, into which is inserted a pin 16 on a mandrel 10. This pin on the mandrel 10 in the opening 15 in the core 9 serves to retain that end of the mandrel 10 centrally disposed in the opening formed by the contacting surfaces of the mold members 1 and 2, and this mandrel 10 is further so supported that a narrow opening will exist all around it into which the material constituting the bottle may be placed for the purpose of vulcanization. The right end of the mandrel 10 is supported by two transversely-disposed bars 17, which are sunk into suitably-shaped openings in the mold members 1 and 2 and are thereby sustained at all times against unintentional displacement. These bars 17 project into the opening in which the material which is to constitute the bottles is placed, and the right end of the mandrel 10 is placed between these two bars 17, and thereby suitably sustained. The bar 17 which is located in the mold member 1 is provided with one or more dowel-pins 18, which pass through suitable openings in the end of the mandrel 10 and also extend into corresponding openings in the bar 17 which is located in the mold member 2. The employment of the dowel-pin 18 serves to prevent any displacement, either lateral or longitudinal, of the mandrel 10 under the influence of the expanding rubber during vulcanization. The placing of the bars 17 in such a manner as to engage and support the right end of the mandrel 10 will serve to form an opening in the material of which the side walls of the bottle is to be formed and as these two bars 17 are in vertical alinement with each other will form in the finished product molded in this device a pair of narrow transverse openings in exact alinement with each other. These bars are of such a length as to extend nearly to the sides of the main openings in the abutting faces of the mold members which are to shape the outside lines of the bottle.

In using this mechanical device for carrying out my improved method the following process will be observed: A sheet of properly-prepared and properly-shaped unvulcanized rubber will be laid in the opening in the mold member 2, and then the mandrel 10 will be placed in position with its right end resting on the lower bar 17 in the mold member 2. The core 9 is then inserted in such a manner that the pin 16 will be in the opening 15 therein, and when in proper position the dowel-pin 13 will enter the opening 12. Another layer of rubber, suitably prepared and shaped, is then laid over the core 9 and mandrel 10 and the upper mold member 1 superposed thereon. The two mold members 1 and 2 are then pressed together by any suitable means, and the mold thus filled and closed is ready for insertion into a vulcanizing heat. It will be here stated that the two sheets of unvulcanized rubber which are placed in the cavity existing around the core 9 and mandrel 10 are so shaped as to be of sufficient width that their edges will abut throughout their entire outer portion. As soon as a vulcanizing heat is applied to the mold the rubber which is to constitute the bottle will expand under the well-known rule of rubber undergoing the heat necessary to vulcanize it, and the abutting edges of the two sheets which surround the core 9 and mandrel 10 will unite together into an integral article at all points where not separated by the core 9 and mandrel 10. As soon as vulcanization has taken place the upper member 1 of the mold is removed and also the core 9. In this connection it will be noted that there is no undercut or overhang in the rubber, which will prevent the ready removal of this core 9. The molded bottle is then lifted from the mold member 2 still containing the mandrel 10. It will be obvious, of course, that the bar 17 in the mold member 1 will be lifted out of connection with the mandrel 10 and the bar 17 in the mold member 2 and will remain in position in its seat. The rubber of which the bottle is formed is then stretched sufficiently adjacent one of the transverse openings formed by the bars 17 to permit the drawing outwardly therethrough of the mandrel 10 without requiring any cutting, tearing, or straining of the material of the bottle. The result is a bottle formed with an integral filling-funnel at one end and with a transverse cut at its base or opposite end existing through both of the side walls of the bottle formed by the bars 17. In order to close this opening, cement is applied to the abutting faces of the walls of the bottle immediately surrounding this opening, and a suitable gromet 19 (see Fig. 5) is then inserted through this opening and upset sufficiently to tightly press together the abutting edges of the side walls of the bottle around the parallel openings formed by the bars 17. The upsetting of this gromet upon the two side walls around the opening existing in both of them is sufficient to hermetically seal this joint in addition to the use of a cement, as just described. It will be seen that a bottle thus made is provided with an integral filling-nozzle and at its base or rear portion with a gromted opening which will serve as a means to hang the bottle upside down when necessary to drain the contents of the same, and yet at all times this gromet 19 will effectually close the opening in the base portion of the bottle through which the mandrel 10 has been withdrawn.

What I claim, and desire to secure by Letters Patent, is—

1. That improvement in the art of manufacturing water-bottles and the like from rubber, which consists in vulcanizing the body and filling-funnel of a water-bottle as a unitary article around a suitable core or mandrel in a mold, and simultaneously forming in the body portion of said bottle an opening at a point distinct from the neck portion thereof, and then removing the core or mandrel through said opening.

2. That improvement in the art of manufacturing water-bottles and the like from rubber, which consists in vulcanizing the body and filling-funnel thereof as a unitary article around a suitable core or mandrel in a mold, and simultaneously forming in the body portion of said bottle an opening distinct from the neck portion thereof, then removing said core or mandrel through said opening and subsequently lining the opening through which said core or mandrel was withdrawn, whereby leakage from said bottle is prevented.

3. That improvement in the art of manufacturing water-bottles from rubber which consists in vulcanizing the body and filling-funnel of a water-bottle as a unitary article around a separable core or mandrel in a suitable mold, then withdrawing the core or mandrel by which the interior of the bottle is shaped through a suitable opening in the body of the bottle at a point distant from the neck portion thereof, and subsequently lining the opening through which the mandrel is removed by means of a gromet.

In testimony whereof I have hereunto set my hand in presence of two subscribing witnesses.

EDWARD J. SCHUTZ.

Witnesses:
C. E. HUMPHREY,
GLENARA FOX.